United States Patent
Dabby et al.

[11] 3,923,373
[45] Dec. 2, 1975

[54] COUPLING TO GRADED INDEX WAVEGUIDE

[75] Inventors: Franklin Winston Dabby, Ewing Township, Mercer County; David Harry Smithgall, Sr., East Windsor Township, Mercer County, both of N.J.

[73] Assignee: Western Electric Company, Incorporated, New York, N.Y.

[22] Filed: July 1, 1974

[21] Appl. No.: 485,048

[52] U.S. Cl....... 350/96 WG; 65/DIG. 7; 350/96 C; 350/96 GN
[51] Int. Cl.² .......................................... G02B 5/14
[58] Field of Search........ 350/96 WG;96 C, 175 GN

[56] References Cited
UNITED STATES PATENTS

| | | |
|---|---|---|
| 3,795,433 | 3/1974 | Channin....................... 350/96 C X |
| 3,817,730 | 6/1974 | Uchida..................... 350/96 WG X |
| 3,825,318 | 7/1974 | Croset et al................... 350/96 WG |
| 3,837,827 | 9/1974 | Carruthers et al. ....... 350/96 WG X |

*Primary Examiner*—John K. Corbin
*Attorney, Agent, or Firm*—Geoffrey D. Green; B. W. Sheffield

[57] ABSTRACT

A specific propagation mode is excited in a multimoded, graded index, planar waveguide by coupling an optical fiber to the waveguide a specific distance below the surface of the guide.

8 Claims, 1 Drawing Figure

COUPLING TO GRADED INDEX WAVEGUIDE

BACKGROUND OF THE INVENTION

1. Field of the Invention

Broadly speaking, this invention relates to optical waveguides. More particularly, in a preferred embodiment, this invention relates to methods and apparatus for exciting and coupling specific propagation modes in a multi-moded, graded index, planar waveguide.

2. Discussion of the Prior Art

Waveguides for integrated optics applications are made in several different ways. The most widely used method involves the deposition of a dielectric material on a dielectric substrate of lower refractive index. See, for example, "Integrated Optics: An Introduction," by S. E. Miller, *Bell System Technical Journal*, Vol. 48, No. 7 (September 1969), pp. 2059-2069, and "Sputtered Glass Waveguide for Integrated Optical Circuit," by J. E. Goell and R. D. Standley, *Bell System Technical Journal*, Vol. 48, No. 10 (December 1969), pp. 3445-3448.

Waveguides made by the above technique comprise a two-dimensional guidance structure having a refractive index distribution that is constant in three different regions with discontinuous jumps at the interfaces between the guiding layer and the two regions bordering on it from above and below.

Another, and in some ways superior, approach to the fabrication of integrated optics waveguides consists of diffusing a suitable material into a substrate with the objective of increasing the refractive index of the substrate near its surface. Alternatively, the refractive index of single-domain crystalline material, such as Lithium Niobate ($LiNbO_3$) or Lithium Tantalate ($LiTaO_3$) is increased by out-diffusion of Lithium Oxide ($Li_2O$) from the surface of the material. Either of these last two mentioned methods results in a planar waveguide with a graded index profile.

While optically superior in many respects, these graded index waveguides are capable of supporting the propagation of many different modes. For example, some guides have been reported as supporting as many as 300 different modes. This multi-mode capability renders graded index waveguides unsuitable for some applications, for example, as optical modulators, demodulators, filters, and the like.

SUMMARY OF THE INVENTION

The problem, then, is to find a technique for exciting a graded index waveguide in such a manner that, essentially, only a single mode propagates through the waveguide, thus permitting the guide to be used in many different applications.

These, and other problems, have been solved by the instant invention, which comprises a planar waveguide consisting of a transparent dielectric member having a graded index of refraction near one surface thereof. The waveguide is capable of supporting multi-mode propagation therethrough. The invention includes a means for coupling optical energy of a selected mode into or out of the waveguide, the coupling means being physically positioned proximate one end of the waveguide and spaced apart from the surface thereof such that the coupling means couples into a region of the waveguide through which essentially only the selected mode can propagate.

The invention and its mode of operation will be more fully understood from the following detailed description, when taken with the appended drawing, in which:

DETAILED DESCRIPTION OF THE INVENTION

Figure 1:
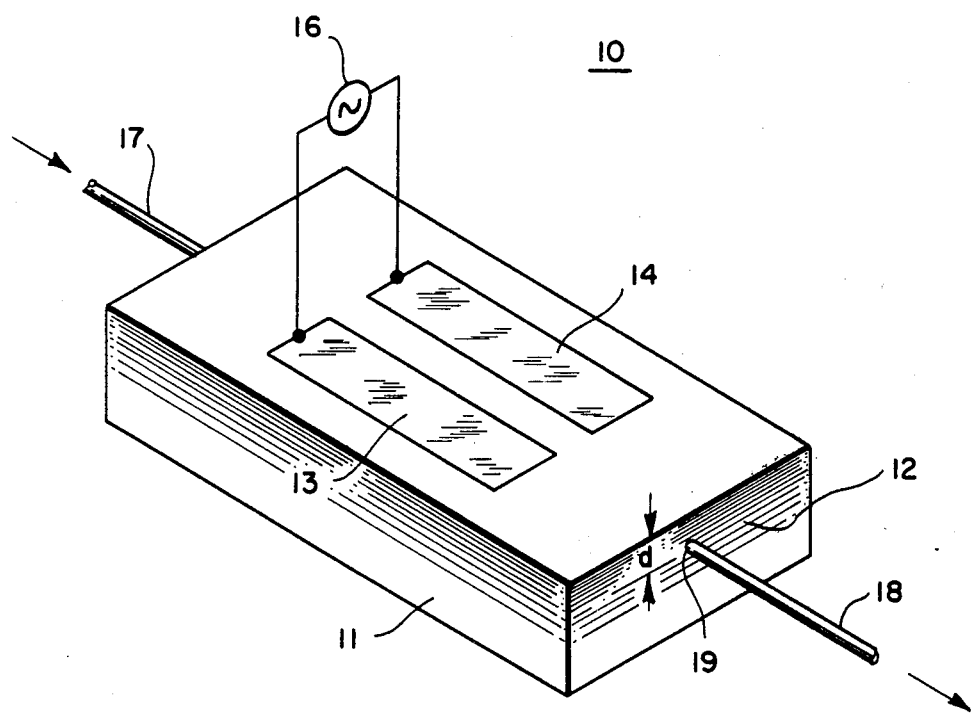
FIG. 1 depicts an optical modulator which employs a graded index waveguide according to the invention.

FIG. 1 depicts an illustrative optical modulator 10 that includes a planar waveguide 11 according to the invention. It should be emphasized, however, that the instant invention is not limited to modulators but is applicable to any graded index, planar waveguide or to any active or passive device incorporating such a waveguide.

As shown in FIG. 1, waveguide 11 comprises a slab of single-crystal, dielectric material, such as $LiNbO_3$ or $LiTaO_3$, that has been treated, for example, by out-diffusion of $Li_2O$, so that a surface region 12 thereof has a higher index of refraction than the rest of the slab. The index of refraction may drop linearly with increasing distance from the upper surface of the slab, but more generally will have a non-linear index gradient, for example, a complementary error function distribution.

A pair of electrodes, 13 and 14, are deposited onto the surface of waveguide 11 and are connected to a source of modulating potential 16, as shown. Electrodes 13 and 14, which may comprise a thin layer of gold which has priorly been evaporated or sputtered onto the surface of waveguide 11, establish within the body of waveguide 11 a fringing electric field, typically, $20\mu$ deep, which in a well-known manner selectively alters the index of refraction in the guide.

Radiant energy, for example, coherent, monochromatic light from a laser, enters the guide via a first optical fiber 17 at the left of the guide (or directly) and exits therefrom via a second optical fiber 18. Although not shown on the drawing, it may be necessary to employ a drop or two of index-matching fluid at the junction between fibers 17 and 18 and waveguide 11, for example, at location 19.

As will be explained more fully below, optical fiber 18 is coupled to waveguide 11, not at the surface of region 12, but at a precisely predetermined distance $d$ down from the surface, which distance varies from waveguide to waveguide and depends upon the particular mode one wishes to propagate in the fiber.

Table 1, below, gives the results of some experiments performed on several different graded index, planar waveguides. In the table, $\Delta n$ represents the change in refractive index between the main part of the guide ($n_0 = 2.214$) and the treated region, $a$ is the depth of the treated region in microns, $k$ is the reciprocal of the wavelength in the guide and $n_{eff}$ is the effective index in the guide.

TABLE 1

| SAMPLE | $\Delta n$ | $a$ | $ka$ | MODE NO. | $n_{eff}$ | ENERGY CONFINEMENT 90% | 100% |
|---|---|---|---|---|---|---|---|
| RS1 | $2.8 \times 10^{-3}$ | $157\mu$ | 1558.88 | 0 | 2.21663 | $14\mu$ | $28\mu$ |
|  |  |  |  | 1 |  | $23\mu$ | $38\mu$ |

TABLE 1-continued

| SAMPLE | Δn | a | ka | MODE NO. | $n_{eff}$ | ENERGY CONFINEMENT 90% | 100% |
|---|---|---|---|---|---|---|---|
| RS1' | $1.9 \times 10^{-3}$ | 157μ | 1558.88 | 0 | 2.21578 | 16μ | 31μ |
|  |  |  |  | 2 | 2.21560 | 35μ | 57μ |
| RS2 | $1.5 \times 10^{-3}$ | 119μ | 1181.57 | 0 | 2.215365 | 16μ | 33μ |
|  |  |  |  | 2 | 2.2152 | 35μ | 53μ |
| RS5 | $1.6 \times 10^{-5}$ | 57μ | 565.76 | 0 | 2.2140060 | 62μ | 143μ |
|  |  |  |  | 1 | 2.2140008 | 148μ | 348μ |
| RS5' | $1.0 \times 10^{-3}$ | 70μ | 695.04 | 0 | 2.214855 | 15μ | 26μ |
| 18 | $4.0 \times 10^{-3}$ | 337μ | 3346.13 | 0 | 2.21786 | 17μ | 34μ |
|  |  |  |  | 1 | 2.21777 | 27μ | 44μ |
|  |  |  |  | 2 | 2.21768 | 35μ | 51μ |
|  |  |  |  | 3 | 2.21762 | 43μ | 59μ |
|  |  |  |  | 4 | 2.21756 | 51μ | 68μ |
|  |  |  |  | 5 | 2.2175~ | — | — |

Considering experimental waveguide RS1, Table 1 shows that 90 percent of the zero mode energy is confined within the first 14μ of region 12 and that virtually 100 percent of the energy is confined within the first 28μ. The first mode, on the other hand, has 90 percent of its energy confined within the first 23μ and virtually 100 percent confined within the first 38μ. It is, thus, clear that while there is some overlap between the zero mode and the first mode energy bands, by appropriately physically positioning an optical fiber, preferably one that is propagating only a single mode, so that it abuts the end of the guide well within the desired energy band, virtually none of the unwanted modes propagating in the waveguide will couple into the fiber and essentially single mode coupling will have been achieved. Precisely the same technique applies to mode excitation in the guide.

Thus, if one were primarily interested in the zero mode, fiber 18 in FIG. 1 would be selected to be a fiber propagating a single mode and, assuming we are still talking about experimental waveguide RS1, the fiber would be positioned such that 14μ<d<28μ. Likewise, if it were desired to energize guide 11 so that it propagates a single mode, such as might be done if the guide were to be used as a modulator, a laser beam, or the like, would be directed at the guide in such a manner that it would impinge thereon within the same 14μ wide energy band.

Strictly speaking, the launch angle for each mode varies from mode to mode. Theoretically, then, fiber 18 should make a different angle with the end of the guide for each mode coupled into or out of the guide. In practice, however, since the difference in refractive index between the substrate 11 and the surface region 12 is small, i.e., typically less than $4 \times 10^{-3}$, the difference between the various launch angles is too small to resolve and may safely be ignored.

It should be noted that the efficient end-excitation of individual modes which is accomplished according to the instant invention could not be accomplished by the use of the more conventional prism coupling technique which requires large differences in the effective index which in the instant invention varies only in the fourth decimal place. Waveguides constructed according to this invention are, thus, far easier and less expensive to manufacture.

It should also be noted that the spatial confinement of lower order modes does not appear to depend critically upon the exact values of the index change or on the guide dimensions. Thus, the guide need not be manufactured to critical tolerances in order to obtain and control these properties, another practical plus factor.

Finally, in the case of the illustrative modulator shown in FIG. 1, the fringing field from electrodes 13 and 14 extends approximately 20μ into the guide, which is more than ample to modulate the zero mode which, as we have seen, is tightly confined near the surface of the guide in a band from, say, 14μ to 20μ deep for the RS1 Sample.

As used herein, the term graded index means an index distribution characterized by small percentage changes of the total index difference which occur within a quarter wavelength of the wave propagating in the guide.

One skilled in the art may make various changes and modifications to the arrangement of parts shown without departing from the spirit and scope of the invention.

What is claimed is:

1. A mode-selective optical device, which comprises:
   a planar waveguide comprising a transparent dielectric member having a graded index of refraction near one surface thereof to render said waveguide capable of supporting different propagation modes at different distances from said surface; and
   means for coupling optical energy of a selected one of said propagation modes into or out of said waveguide, said coupling means being physically positioned proximate one end of said waveguide, the optical axis of said coupling means being spaced a distance from said surface such that said coupling means couples into the region of said waveguide capable of supporting essentially only said selected mode.

2. The device according to claim 1 wherein said energy coupling means comprises an optical fiber capable of supporting essentially said selected propagation mode.

3. The device according to claim 1 wherein said energy-coupling means comprises a source of a beam of coherent radiant energy.

4. The device according to claim 1 wherein said transparent dielectric member comprises a single-domain crystalline material.

5. An optical modulator, which comprises:
   a substrate of single-domain, crystalline material, said substrate having a graded index of refraction near one surface thereof to render said substrate capable of supporting different propagation modes at different distances from said surface;
   first and second electrodes overlaid on said one surface;

means for supplying a modulating potential to said electrodes thereby to establish a fringing field in said substrate;

means for introducing optical energy into said substrate; and means for coupling modulated optical energy of a selected one of said propagation modes out of said waveguide, said coupling means being physically positioned proximate one end of said substrate, the optical axis of said coupling means being spaced a distance from said surface such that said coupling means couples into the region in said substrate capable of supporting essentially only said selected mode.

6. The modulator according to claim 5 wherein said substrate is comprised of $LiNbO_3$ or $LiTaO_3$.

7. The modulator according to claim 6 wherein said graded index of refraction is induced by out-diffusing $Li_2O$ from a region of said substrate, proximate said surface.

8. A method of coupling optical energy of a selected mode into or out of a planar waveguide, which comprises the steps of:

providing a graded index of refraction near one surface of said waveguide to render said waveguide capable of supporting different propagation modes at different distances from said surface, and physically positioning an optical energy coupling means proximate one end of said waveguide with the optical axis of the coupling means a predetermined distance from said surface of said waveguide to couple into the region of said waveguide capable of supporting essentially only said selected mode.

* * * * *